United States Patent

Grimm

[15] 3,687,182
[45] Aug. 29, 1972

[54] SELF-LOCKING ONE-PIECE METAL CASTLE NUT

[72] Inventor: David W. Grimm, Watchung, N.J.

[73] Assignee: Amerace Esna Corporation, New York, N.Y.

[22] Filed: Dec. 9, 1969

[21] Appl. No.: 883,439

[52] U.S. Cl. ..................................151/21 B, 151/5
[51] Int. Cl. .........................F16b 39/02, F16b 39/28
[58] Field of Search..........151/21 B, 21 A, 21 C, 5, 6, 151/; 10/86 A, 86; 85/32

[56] References Cited

UNITED STATES PATENTS

| | | |
|---|---|---|
| 2,754,871 | 7/1956 | Stoll..........................151/21 B |
| 3,199,564 | 8/1965 | Waeltz......................151/21 B |
| 3,277,942 | 10/1966 | Dwyer.......................151/21 B |
| 3,415,154 | 12/1968 | Skierski................85/32 V X |
| 3,507,313 | 4/1970 | Stockslager..............151/21 B |

Primary Examiner—Ramon S. Britts
Attorney—Samuelson & Jacob

[57] ABSTRACT

A thin-walled metal castle nut including circumferentially spaced slots adjacent one end thereof, an integral flange adjacent the other end thereof, a thread extending from end to end thereof and portions of the wall permanently deformed radially inwardly at axial locations between the slots and the flange, and preferably in axial alignment with the slots.

9 Claims, 8 Drawing Figures

PATENTED AUG 29 1972

INVENTOR.
DAVID W. GRIMM
BY
Samuelson & Jacob
HIS ATTORNEYS

INVENTOR.
DAVID W. GRIMM
HIS ATTORNEYS

SELF-LOCKING ONE-PIECE METAL CASTLE NUT

The present invention relates generally to nuts and pertains, more specifically, to castle nuts and especially to an all metal self-locking castle nut.

Castle nuts, also known as castellated nuts, are commonly employed where it is required that a nut be positively retained upon a bolt or other threaded male element, usually by means of a cotter pin which passes through a lateral aperture in the bolt and through corresponding diametrically opposed slots in the nut.

Because there is always the possibility that the installer of a castle nut may inadvertently neglect to insert a cotter pin, or that an inserted cotter pin may, in time, fail with the result that the nut will become free to rotate and become loose, castle nuts have been developed which include some further locking means to hold the nut in place upon a bolt. Some of these means have appeared in the form of self-locking mechanisms of the prevailing torque type. The most common of these nuts are relatively thick-walled nuts which include either a non-metallic locking insert or a thread which has been deformed in both the lateral and longitudinal directions so as to frictionally engage the corresponding thread of a bolt. The former type of nut is usually bulky in that the body of the nut must provide room for the insert with a concomitant reduction of effective thread length, while in the latter type the nut wall is so thick and rigid that the thread of a corresponding threaded member, such as a bolt or screw, upon which the nut is installed is rapidly damaged or even destroyed and the elastic recovery of the locking element is insufficient to attain a satisfactory lock with a bolt thread at all bolt tolerance extremes upon reuse of the nut.

Additionally, in some installations, such as in aircraft and aircraft components, relatively thin-walled, light weight compact nuts have come into common use and it would be advantageous to have available a nut which would provide the safety features of a castle nut coupled with a supplementary self-locking mechanism while retaining the advantages of a light weight, compact nut of high strength.

It is therefore an important object of the invention to provide a castle nut which is compact and light weight and includes the additional safety feature of a self-locking mechanism.

Another object of the invention is to provide an all metal one-piece castle nut which includes a prevailing torque type self-locking mechanism without sacrificing light weight and compactness.

A further object of the invention is to provide a castle nut which includes a prevailing torque type self-locking mechanism and which may be reused many times without loss of its self-locking characteristics and without excessive damage to a mating bolt or screw.

A still further object of the invention is to provide a relatively light weight self-locking castle nut which will remain serviceable at relatively high temperatures.

Yet another object of the invention is the provision of a self-locking castle nut which is relatively inexpensive, readily fabricated and easily installed with standard tools.

The above objects, as well as further objects and advantages, are attained by the invention which may be described briefly as a self-locking one-piece metal castle nut comprising a thin-walled, internally threaded tubular body, the thread extending from adjacent one end to adjacent the other end of the body, an annular flange integral with the body adjacent one end thereof and projecting radially outwardly, at least one pair of diametrically opposite slots in the wall of the body, extending axially from the other end of the body toward the flange and terminating at a location spaced axially from the flange, and at least a portion of the body located axially between the flange and the termination of at least one of the slots being permanently deformed radially inwardly with respect to adjacent surrounding portions of the body, the thickness of the wall of the body and the amount of inward deformation of the inwardly deformed portion being such that upon threading of the nut upon a mating externally threaded member, the thread of the inwardly deformed portion will engage the member and will be resiliently deflected radially outwardly to establish a locking force between the nut and the member. A portion of the thread is permanently deflected radially inwardly at a location corresponding to the location of the permanently deformed body portion and, where the mating member has a lateral aperture of prescribed circumferential width, the circumferential extent of the permanently deformed body portion is such that the circumferential extent of the inwardly deflected thread portion is greater than the width of the later aperture. Preferably, the flange has an axial thickness sufficient to preserve, relatively undeformed, at least one full thread at the flanged end of the nut. Preferably, each permanently deformed portion is circumferentially located in axial alignment with one of the slots. When so located, the permanently deformed body portion has a circumferential extent great enough so that the circumferential extent of the inwardly deflected thread portion is greater than the circumferential width of the slot with which the inwardly deformed body portion is axially aligned.

The invention will be more fully understood and still further objects and advantages thereof will become apparent from the following detailed description of embodiments of the invention illustrated in the accompanying drawing, in which.

Figure 1:
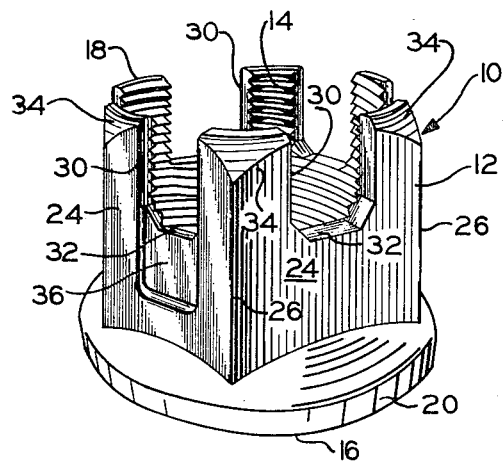
FIG. 1 is a perspective view of a castle nut constructed in accordance with the invention.
Figure 2:
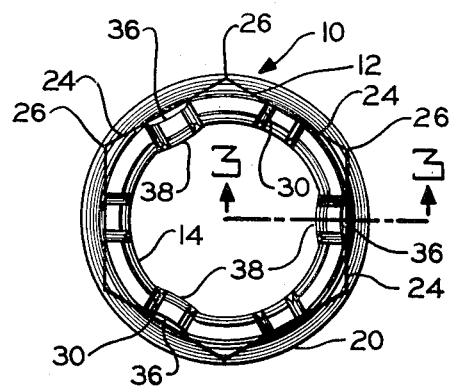
FIG. 2 is a plan view of the nut of FIG. 1.
Figure 3:
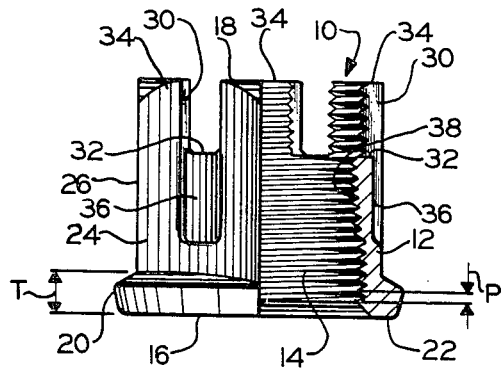
FIG. 3 is an elevational view of the nut, partially sectioned along line 3—3 of FIG. 2.

Referring now to the drawing, and especially to FIGS. 1 through 3, a castle nut 10 is shown constructed in accordance with the invention and includes a relatively thin-walled tubular body 12 having an internal thread 14 which extends axially from one end 16 of the nut to the other end 18.

An integral flange 20 extends radially outwardly from the tubular body 12 at the end 16 and provides a clamping surface 22 of sufficient area to render the nut effective, the perimeter of the surface 22 being greater in length than the outer periphery of the thin-walled tubular body 12.

The outer surface of the tubular body 12 between the flange 20 and the other end 18 is provided with a wrenching configuration, in this instance the wrenching configuration being in the form of a conventional hexagon with six wrenching faces 24 and six corners 26. The diameter of the flange 20 is at least equal to the diametric distance across the corners 26.

Nut 10 is a castle nut by virtue of the presence of slots 30 shown located in each face 24 intermediate adjacent corners 26, each slot 30 extending axially from the other end 18 of the nut toward the flange 20 and terminating at a location 32 spaced axially from the flange. Conversely, projections 34 are located between adjacent slots 30 and extend parallel to one another in an axial direction. One of the pairs of diametrically opposite slots 30 will serve to receive a cotter pin when the nut is installed in the manner which is conventional in the use of castle nuts.

In order to provide a prevailing torque type self-locking mechanism, a portion 36 of the wall of tubular body 12 located axially between the termination of the slot 30 at 32 and the flange 20 is permanently deformed radially inwardly to establish an inwardly deflected, out-of-round thread portion 38 where the wall of the tubular body is inwardly deformed. In this instance each portion 36 is circumferentially located in axial alignment with a slot 30.

Because the wall of the tubular body is relatively thin and because the inwardly deformed portions 36 are each located circumferentially where the wall is thin relative to portions of the wall at other circumferential locations, in this instance each portion 36 being adjacent the termination of a slot 30, threading of the nut 12 upon a mating threaded member will elastically deflect the inwardly deformed portions outwardly to establish a firm but gentle locking force between the thread portions 38 and the thread of the mating member. Since the locking force is obtained from a resilient, largely elastic, deflection of the permanently deformed portions 36 and since the deflection is facilitated by the resilience of the thin wall construction and the presence of slots 30, damage to the thread of a mating member, as well as to the thread of the nut, is minimized and the nut exhibits a high degree of reusability.

It has been found that for the desired resilient operation of the nut, the wall thickness of the tubular body 12 is preferably limited to no more than that which enables the wrenching size of the nut to be approximately 1.3 times the nominal thread diameter of the nut. In nut 10, the wrenching size would be the distance between opposite parallel flat faces 24. The following table illustrates typical dimensions for obtaining the necessary thin-walled construction in nuts of common sizes and compares these dimensions with corresponding dimensions found in standard hexagonal nuts:

TABLE A

Maximum Wrenching

| Thread Size | Size for Thin-Walled Construction | Standard Hexagonal Nut Wrenching Size |
|---|---|---|
| 10–32 | .250 | .375 |
| 1/4–28 | .320 | .438 |
| 5/16–24 | .400 | .500 |
| 3/8–24 | .490 | .562 |
| 1/2–20 | .650 | .750 |

The presence of flange 20 provides the additional advantage of reinforcing the tubular body of the nut at the base end 16 of the nut. By choosing the proper flange thickness, the roundness of the lead thread, i.e., the first full thread leading from the end 16 of the nut 10 toward end 18, may be sufficiently preserved to assure that the nut is readily started upon a mating member before the self-locking mechanism comes into play. In other words, the first full thread is maintained relatively undeformed over its full pitch so that the nut may be started without excessive resistance. Additionally, the location of each permanently deformed portions 36 adjacent a slot 30, as well as the reinforcement provided by the flange aid in keeping the projections 34 in proper alignment, i.e., axially parallel and untwisted, to assure that the threads of the projections effectively engage the mating member so that the full length of the thread from end to end of the nut will be in effective engagement with the thread of the mating member.

It has been found that a flange which is at least as thick as the length of one thread pitch is sufficient to attain the above advantages. Thus, in nut 10, the flange thickness T, measured at the root of the flange, that is, at the location where the flange 20 intersects the tubular body 12, is preferably at least equal to the length of one pitch P of thread 14. The following table illustrates a minimum flange thickness measured at the thickest portion of the flanges of nuts constructed in accordance with the invention in common thread sizes:

TABLE B

| Thread Size | Minimum Flange Thickness Measured at Thickest Portion |
|---|---|
| 10–32 | .031 |
| 1/4–28 | .036 |
| 5/16–24 | .042 |
| 3/8–24 | .042 |
| 1/2–20 | .050 |

Figure 4:
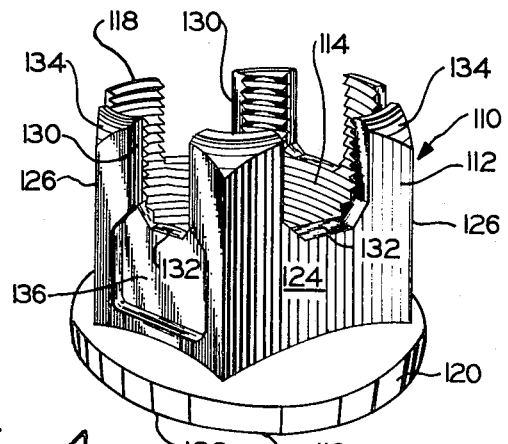
FIG. 4 is a perspective view of another castle nut constructed in accordance with the invention.
Figure 5:
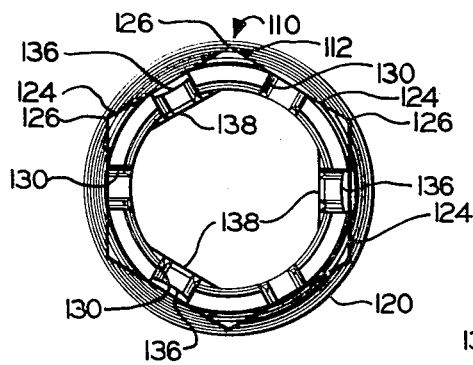
FIG. 5 is a plan view of the castle nut of FIG. 4.
Figure 6:
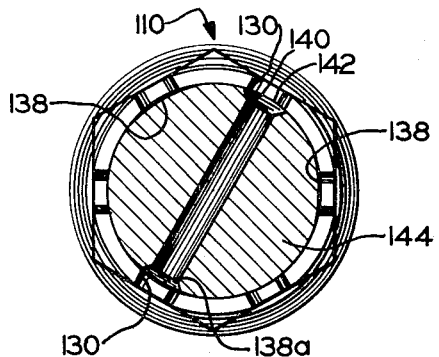
FIG. 6 is a plan view of the castle nut of FIGS. 4 and 5 installed upon a complementary threaded member shown in section.

It is not necessary to include an inwardly deformed portion adjacent each slot in each flat area of a nut constructed in accordance with the invention; however, it is noted that since a castle nut is to be used in connection with a mating threaded member which has a lateral aperture, there is the possibility that upon completion of the installation of a nut constructed in accordance with the invention, at least one of the inwardly deformed portions will be aligned with the aperture in the mating member and will thus be out of engagement with a mating thread, will not be elastically deflected outwardly and will not provide a locking force. In order that all locking force is not lost when such a condition exists, the inwardly deformed portions 36 which are provided in nut 10 are not diametrically opposed so that even if one thread portion 38 falls within the aperture of a mating member, the other two portions 38 will still provide a sufficient locking force. The provision of inwardly deformed portions 36 on alternate faces 24 accomplishes the above objective without excessive distortion of the nut.

Where it is desirable to assure that the torque applied during installation of a castle nut of the invention be within a closely controlled relatively narrow range as successive inwardly deformed portions of the nut pass across the aperture of a threaded mating member, the circumferential width of each inwardly deformed portion may be increased so as to be greater than the corresponding width of the aperture. Thus, turning to the nut 110 illustrated in FIGS. 4 through 6, it will be seen that the nut 110 is constructed similar to nut 10 in that a thin-walled tubular body 112 has an internal thread 114 which extends axially from one end 116 of the nut to the other end 118 and an integral flange 120 extends radially outwardly from the tubular body 112 at the end 116 and provides a clamping surface 122 of sufficient area to render the nut effective. Again, the outer surface of the tubular body 112 between the flange 120 and the other end 118 is provided with a wrenching configuration in the form of a conventional hexagon with six wrenching faces 124 and six corners 126. Slots 130 are located in each face 124 intermediate adjacent corners 126 and each slot extends axially from the other end 118 of the nut toward the flange 120 and terminates at a location 132 spaced axially from the flange. Projections 134 extend parallel to one another in an axial direction.

In order to provide a prevailing torque type self-locking mechanism, a portion 136 of the wall of the tubular body 112 located axially between the termination of a slot 130 at 132 and the flange 120 and circumferentially in axial alignment with a slot 130 is permanently deformed radially inwardly to establish an inwardly deflected out-of-round thread portion 138 where the wall of the tubular body is inwardly deformed. However, in nut 110, the inwardly deformed portions 136 extend circumferentially beyond the width of the slots 130 in order to assure that threaded portions 138 extend far enough beyond the corresponding width 140 (see FIG. 6) of a lateral aperture 142 of a mating threaded member 144 so that even when a threaded portion 138 is in direct alignment with the aperture, as illustrated at threaded portion 138a in FIG. 6, a sufficient part of the threaded portion will still engage the thread of the mating member adjacent the lateral aperture 142 to establish a locking force. Thus, the self-locking mechanism of nut 110 which includes inwardly deformed portions 136 of a circumferential width greater than the corresponding width 140 of aperture 142 will provide an effective locking force independent of the orientation of nut 10 upon the mating member 144, as well as maintain a relatively narrow variation in wrenching torque as the nut is installed upon the mating member.

Figure 7:
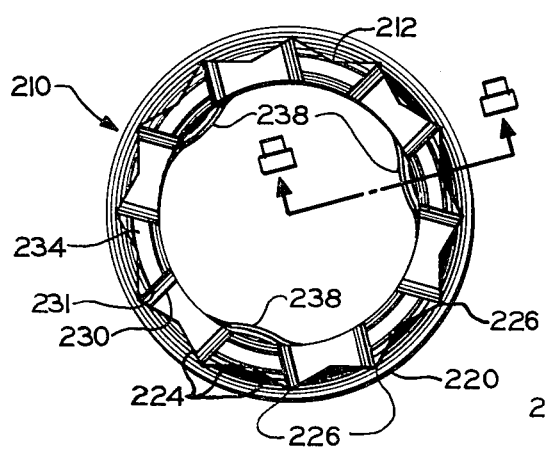
FIG. 7 is a plan view of still another castle nut constructed in accordance with the invention.
Figure 8:
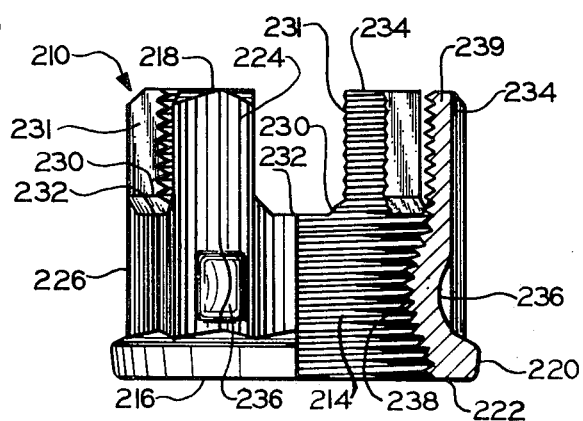
FIG. 8 is view of the nut, partially sectioned along line 8—8 of FIG. 7.

Referring now to FIGS. 7 and 8, still another nut 210 is shown constructed in accordance with the invention and includes a thin-walled tubular body 212 having an internal thread 214 which extends axially from one end 216 of the nut to the other end 218. An external flange 220 extends radially outwardly from the tubular body 212 at the end 216 and provides a clamping surface 222 of sufficient area to render the nut effective.

Nut 210 is a "12-point" nut, the outer surface of the tubular body 212 between the flange 220 and the other end 218 being provided with a wrenching configuration in the form of what is known as a "double hexagon" establishing 24 wrenching faces 224 and 12 points 226. Three pairs of diametrically opposite slots 230 are located between every other pair of adjacent points 226, the slots 230 each having parallel sides 231 and extending axially from the other end 218 of the nut toward the flange 220. Each slot terminates at a location 232 spaced axially from the flange and adjacent slots 232 establish projections 234 which extend parallel to one another in an axial direction.

In order to provide a prevailing torque type self-locking mechanism, a portion 236 of the wall of the tubular body 212 located axially between the termination of a slot 230 at 232 and the flange 220 is permanently deformed radially inwardly to establish an inwardly deflected out-of-round thread portion 238 where the wall of the tubular body is inwardly deformed. Unlike the previously described embodiments, however, each inwardly deformed portion 236 is located circumferentially in axial alignment with a projection 234, rather than in axial alignment with a slot. Since the 12-point wrenching configuration of the outer surface of the tubular body 212 provides a relatively thin wall section 239 at circumferential locations intermediate the circumferential width of each projection 234, as well as intermediate the circumferential width of each slot 230, the advantages of placing the inwardly deformed portions 236 at circumferential locations where the wall is thin relative to the wall thickness at other circumferential locations are attained by the illustrated placement of the inwardly deformed portions 236. Alternately, the inwardly deformed portions 236 may be placed in axial alignment with slots 230, as in the earlier described embodiments.

It will be apparent that the slotted, thin-walled construction of the above described castle nuts in combination with a flanged end and inwardly deformed portions located intermediate the ends of the nut, and preferably at circumferential locations techniques the wall of the nut is thin relative to the wall thickness at other circumferential locations, provides a compact nut in that the full thread length effectively engages the mating member while portions of the thread intermediate the ends of the nut provide a self-locking force in a construction which is flexible enough to provide a high degree of reusability with minimal wear and damage to the mating threads. The nut is of a one-piece all metal construction which is suitable for relatively high temperature applications. The hardness of the metal is chosen to assure that the nut body will flex resiliently, and largely elastically, during operation of the self-locking mechanism as described above. The configuration is easily fabricated employing conventional techniques of nut manufacture and installation is simple with ordinary tools.

It is to be understood that the above detailed description of embodiments of the invention is provided by way of example only. Various details of design and construction may be modified without departing from the true spirit and scope of the invention.

The embodiments of the invention in which an exclusive property or privilege is claimed are defined as follows:

1. A self-locking one-piece metal castle nut comprising:
   a thin-walled, internally threaded tubular body having a thread extending from adjacent one end to adjacent the other end of the body;
   an annular flange integral with the body adjacent one end thereof and projecting radially outwardly;
   at least one pair of diametrically opposite slots in the wall of said body, extending axially from the other end of the body toward the flange and terminating at a location spaced axially from the flange; and
   at least a portion of the body located axially between the flange and the termination of at least one of the slots and circumferentially in axial alignment with one of said slots being permanently deformed radially inwardly with respect to adjacent surrounding portions of the body;
   a portion of the thread being permanently deflected radially inwardly at a location corresponding to the location of the permanently deformed body portion, the circumferential extent of the permanently deformed body portion being such that the circumferential extent of the inwardly deflected thread portion is greater than the circumferential width of the slot with which the inwardly deformed body portion is axially aligned;
   the thickness of the wall of the body and the amount of inward deformation of said inwardly deformed body portion being such that upon threading of the nut upon a mating externally threaded member, the corresponding thread portion will engage said member and will be resiliently deflected radially outwardly to establish a locking force between the nut and the member.

2. The nut of claim 1 wherein said flange has an axial thickness sufficient to preserve, relatively undeformed, at least one full thread at the end of the thread adjacent the flange.

3. The nut of claim 2 wherein:
   the body has a hexagonal external wrenching configuration; and
   each of said slots is located between a pair of adjacent corners of the wrenching configuration.

4. The nut of claim 3 including at least two said inwardly deformed body portions which are not diametrically opposed.

5. The nut of claim 4 including three said inwardly deformed body portions, no two of which are diametrically opposed.

6. The nut of claim 1 wherein the thickness of the flange, at least where the flange intersects the tubular body, is at least equal to the length of one thread pitch.

7. The nut of claim 1 wherein the wall thickness of the tubular body is no more than that which enables the wrenching size of the nut to be approximately 1.3 times the nominal thread diameter.

8. The nut of claim 7 wherein the thickness of the flange, at least where the flange intersects the tubular body, is at least equal to the length of one thread pitch.

9. A self-locking one-piece metal castle nut comprising:
   a thin-walled, internally threaded tubular body having a thread extending from adjacent one end to adjacent the other end of the body;
   an annular flange integral with the body adjacent one end thereof and projecting radially outwardly;
   at least one pair of diametrically opposite slots in the wall of said body, extending axially from the other end of the body toward the flange and terminating at a location spaced axially from the flange; and
   at least a portion of the body located axially between the flange and the termination of at least one of the slots being permanently deformed radially inwardly with respect to adjacent surrounding portions of the body;
   a portion of the thread being permanently deflected radially inwardly at a location corresponding to the location of the permanently deformed body portion;
   the thickness of the wall of the body and the amount of inward deformation of said inwardly deformed body portion being such that upon threading of the nut upon a mating externally threaded member, the corresponding thread portion will engage said member and will be resiliently deflected radially outwardly to establish a locking force between the nut and the member, said member having a lateral aperture of prescribed circumferential width and the circumferential extent of the permanently deformed body portion being such that the circumferential extent of the inwardly deflected thread portion is greater than the width of said lateral aperture.

* * * * *